June 13, 1961 H. K. JANSSEN 2,988,709

TRANSISTORIZED BLOCKING OSCILLATOR FOR TELEMETERING CIRCUITS

Filed July 31, 1958

INVENTOR

HERBERT K. JANSSEN

BY K. G. Doub

ATTORNEY

United States Patent Office 2,988,709

Patented June 13, 1961

2,988,709
TRANSISTORIZED BLOCKING OSCILLATOR FOR TELEMETERING CIRCUITS

Herbert K. Janssen, Towson, Md., assignor to The Bendix Corporation, a corporation of Delaware Filed July 31, 1958, Ser. No. 752,215
2 Claims. (Cl. 331—112)

Air-borne telemetering instruments are required to be as light in weight and as compact as possible. An example is the so-called radiosonde, in which an audio frequency oscillator operates to modulate a radio frequency carrier as a function of changes in humidity, temperature and sometimes other parameters. Substitution of the conventional electron tube by a transistor as the active element in the blocking oscillator circuit and providing the proper coordinated transistor circuitry is a step in the right direction, since not only is the transistor smaller and lighter than the comparable electron tube, but its use eliminates the necessity for filament power. However, known types of transistorized blocking oscillators capable of use in telemetering circuits are open to certain objections: in many instances they require two or more voltage sources, sometimes of different polarity; they cannot utilize the standard radiosonde B-battery without circuit modification; they require more than one transistor, and they are not readily adaptable to the measuring circuitry.

The primary object of the present invention, therefore, is to provide a transistorized blocking oscillator which will avoid the above-noted objections and is otherwise well adapted for use in telemetering circuits.

Another object is to provide a blocking oscillator for telemetering circuits utilizing a single transistor and coacting circuitry arranged in a manner such that sensing elements responsive to the condition or conditions being measured may be located in the base and/or emitter circuits.

The foregoing and other objects and advantages will become apparent in view of the following description taken in conjunction with the drawings, wherein.

Figures 1, 3:
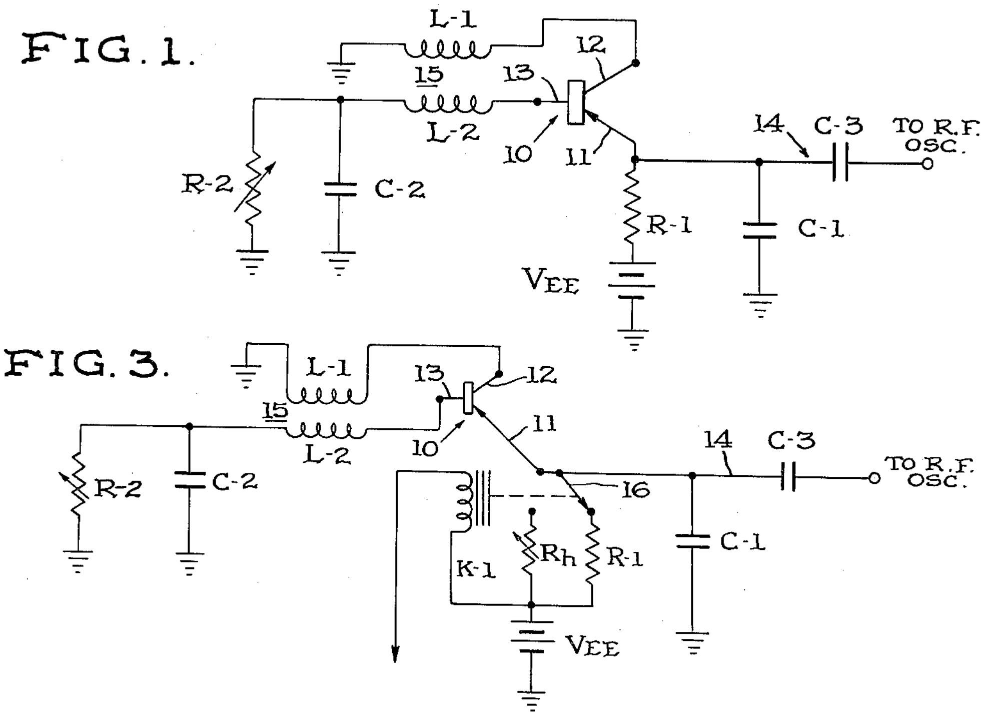
FIG. 1 is a schematic circuit diagram of a blocking oscillator in accordance with the invention.
FIG. 3 is a circuit diagram of the blocking oscillator of FIG. 1 having measuring resistances in both the emitter and base circuits.

Referring to FIG. 1 of the drawings, the blocking oscillator circuit illustrated therein includes as its active element a solid-state conduction triode commonly known as a transistor, generally indicated at 10; it is provided with a forwardly-biased emitter electrode 11, a rearwardly-biased collector electrode 12 and a grounded base electrode 13. The emitter electrode is connected to the positive side of a suitable source of potential, here illustrated as a battery $V_{EE}$, across resistor R–1. An audio frequency output circuit 14 leads from the emitter circuit to a radio frequency oscillator, not shown, across coupling capacitor C–3. Arranged in series with the resistor R–1 and battery $V_{EE}$ is a capacitor C–1, which in connection with the resistor R–1 provides a timing network, the function of which will be explained in the description of operation.

The collector circuit leads to ground or a suitable reference voltage across the primary L–1 of an oscillation transformer 15, while the base circuit is connected to ground or a suitable reference voltage across the secondary L–2 of the said transformer. A capacitor C–2 and measuring resistor R–2 are arranged in parallel in the grounding circuit of the base and provide another timing network coacting with that provided by the resistor R–1 and capacitor C–1.

*Operation*

The theory of operation is as follows:

Assuming the circuit to be energized at time equal to zero, the emitter 11 is immediately made positive with respect to the base 10, and since the semi-conductor or transistor in the example shown is of the PNP variety, current will flow in the primary winding L–1 of the oscillation transformer 15 in the collector circuit. This current induces a voltage in the secondary L–2 of the transformer, the polarity being such that the base is made more negative, thereby increasing the forward bias and causing an increase in collector current, which creates an additional bias; and due to the positive feedback action, the collector circuit rapidly saturates. When saturation occurs, the magnetic field of the coil L–2 immediately collapses with the result that a high positive voltage is applied to the base, returning the transistor to an "off" condition or passive state. During the period in which the transistor is conducting, a large current flows through R–1 from $V_{EE}$ to the emitter, causing the voltage across C–1 to be reduced in value; and at the same time the voltage across C–2 is increasing due to the polarity of the voltage induced in the secondary winding L–2 of the audio transformer. As soon as the transistor is cut off, capacitor C–1 charges through the resistor R–1 towards the supply voltage $V_{EE}$, and simultaneously the capacitor C–2 discharges through measuring resistor R–2 towards ground or reference voltage. When the voltage at the emitter (due to the charging of C–1) is equal to the voltage on the base (due to the discharge of C–2) the transistor again conducts and the cycle repeats itself.

It is evident from the foregoing that the cut-on point of the transistor is controlled substantially equally by the timing networks consisting of R–1, C–1 and R–2, C–2, and by a proper choice of circuit parameters, a satisfactory degree of voltage stability can be achieved. For example, a 10% change in the value of R–1 or C–1 would have approximately the same effect on the circuit blocking rate as a 10% change in R–2 or C–2. R–2 is illustrated as being of the variable type; it could be, for example, a thermistor responsive to changes in temperature, or a humidity element (hygristor) responsive to changes in relative humidity. The rate of discharge of capacitor C–2 is a direct function of the instantaneous value of resistor R–2, other circuit parameters remaining constant; and this results in a modulating pulse whose frequency varies with changes in the value of R–2.

Figure 2A:
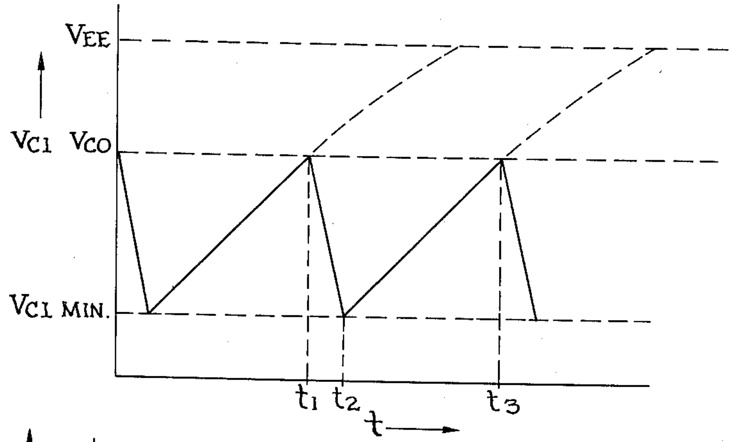
FIGS. 2A and 2B are waveforms depicting the operation of the circuit of FIG. 1.

Referring to FIG. 2A, here the voltage waveform across C–1 in a steady state is illustrated. The discharge time $t_2$ minus $t_1$ is determined by the characteristics of the transistor 10 and the coil L–1 of the audio or oscillation transformer, and the total amplitude of the voltage is also a function of these parameters. The time $t_3$ minus $t_2$ is an exponential function determined by the network R–1, C–1 and the discharge characteristics of the base circuit. The voltage $V_{co}$ is that voltage with respect to ground at which the base and emitter are at equal potential, i.e., the cut-on point of the transistor. The waveform of FIG. 2A represents the modulating output to the R.F. oscillator.

Figure 2B:
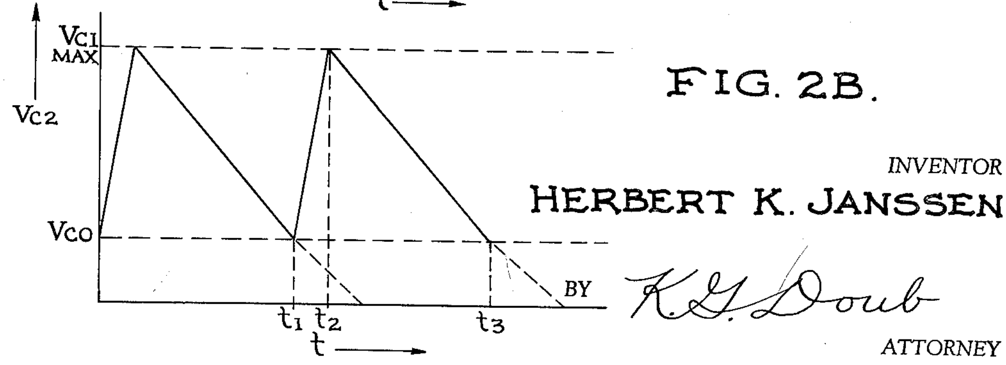

In FIG. 2B the waveform across capacitor C–2 is illustrated. Here the time $t_2$ minus $t_1$ is a function of the characteristics of the transistor and the coil L–2 of the transformer 15, and the total voltage amplitude is also a function of these parameters. The time $t_3$ minus $t_2$ is an exponential function of the network R–2, C–2, and is also dependent upon the charging action of capacitor C–1 in the emitter circuit.

FIG. 3 shows an example of how the blocking oscillator of FIG. 1 can be adapted for measuring resistances or like impedance elements in both the base and emitter circuits. In this figure, parts which correspond to those of FIG. 1 are given similar reference numerals. The only parts added are the variable resistor $R_h$ in the emitter circuit and a relay switch 16 for switching the variable resistor $R_h$ and the constant reference resistor R–1 alternately into and out of the input circuit. This switching action could be effected by a relay solenoid K–1 energized through a baroswitch and commutator in the same manner as in the patent to Crosby No. 2,558,342. In FIG. 3, the resistor R–1 serves as a reference resistor, and it can be assumed that the variable resistor $R_h$ is responsive to changes in relative humidity. The pulse rate of the blocking oscillator then becomes a function of changes in temperature and relative humidity.

While the transistor in the present instance is shown as of the PNP type, it could be of the PNP type, in which event the circuitry would be rearranged so that the bias voltage would be negative instead of positive.

While only two forms of measuring circuits have been shown, it will be obvious that numerous other types of such circuits can be utilized with the oscillator as exemplified in FIG. 1.

What is claimed is:

1. A blocking oscillator particularly adapted for a weather-condition telemetering device having a measuring circuit and a pulse-modulating discharge circuit, comprising: a single source of supply voltage, a junction type transistor having base, emitter and collector electrodes, an oscillation transformer having a primary coil one end of which is connected to said collector electrode and the other end of which leads to ground and a secondary coil one end of which is connected to said base electrode and the other end of which is connected to a first resistance-capacitance network including a variable measuring resistor and a condenser connected in parallel to ground, a second resistance-capacitance network including a resistor connected in series with said emitter electrode and said single source of supply voltage and a capacitor connected in parallel with said latter resistor and said source of supply voltage, said emitter electrode being also connected to said discharge circuit, said transistor when the oscillator becomes energized remaining in a state of conduction until the collector circuit saturates whereupon the magnetic field of the primary coil collapses and the capacitance of the second network charges through its coacting resistance towards the supply voltage and the capacitance of said first network discharges through its coacting resistance towards ground, and when the voltages impressed on the emitter and base electrodes are substantially equal the transistor again conducts and the cycle repeats itself.

2. A blocking oscillator as claimed in claim 1 wherein said second R-C network includes a fixed reference resistor and a variable measuring resistor connected in parallel between said emitter electrode and the positive side of said voltage source.

References Cited in the file of this patent

UNITED STATES PATENTS

| | | |
|---|---|---|
| 2,745,012 | Felker | May 8, 1956 |
| 2,854,614 | Light | Sept. 30, 1958 |